(No Model.)

O. L. CARTER.
PRINTER'S GALLEY.

No. 538,894. Patented May 7, 1895.

Witnesses
Victor J. Evans.
J. F. Beale.

Inventor
Owen L. Carter,
by W. A. Redmond
Attorney

UNITED STATES PATENT OFFICE.

OWEN L. CARTER, OF BERRYVILLE, VIRGINIA.

PRINTER'S GALLEY.

SPECIFICATION forming part of Letters Patent No. 538,894, dated May 7, 1895.

Application filed February 28, 1895. Serial No. 540,057. (No model.)

*To all whom it may concern:*

Be it known that I, OWEN L. CARTER, a citizen of the United States, residing at Berryville, in the county of Clarke and State of Virginia, have invented certain new and useful Improvements in Printers' Galleys; and I do hereby declare the following to be a full, clear, and exact description of the invention, such as will enable others skilled in the art to which it appertains to make and use the same.

This invention relates, generally, to printers' galleys, and particularly to that type of such devices in which the side stick is adjustably attached to the end ledge of the galley, and it has for its object to provide a simple, durable, and comparatively inexpensive galley whose side stick is adapted to be instantly moved into the proper position to lock up the matter, and it consists of the parts and combinations of parts hereinafter described and claimed.

Figure 1:
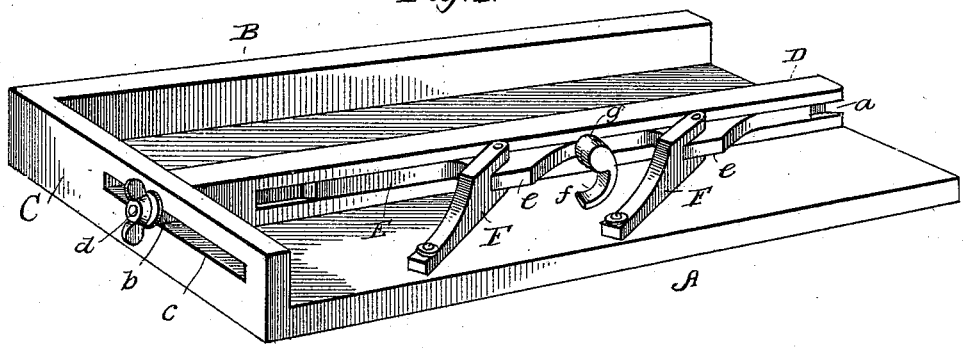
Figure 2:
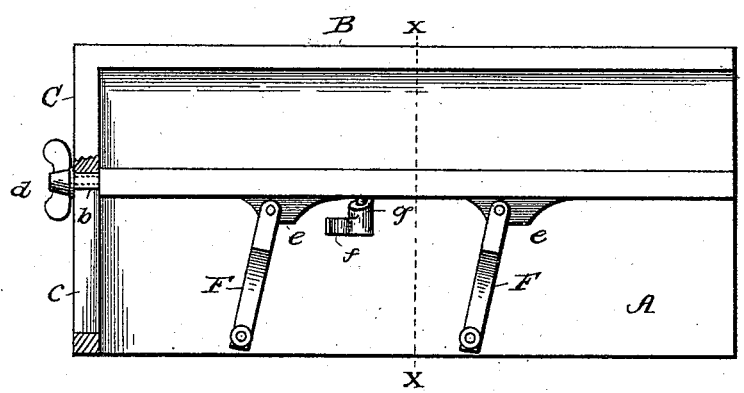
Figure 3:
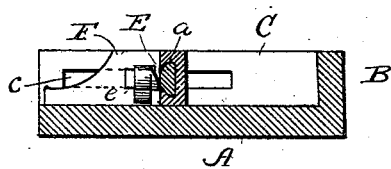
Figure 4:
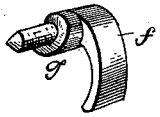

In the accompanying drawings, forming a part of this specification, Figure 1 is a perspective view of my improved galley; Fig. 2, a plan view; Fig. 3, a vertical section on the line *x x*, Fig. 2; and Fig. 4, a detail view of the thumb-screw.

Similar letters refer to similar parts throughout all the views.

A represents the base plate, B the side ledge and C the end ledge of my improved printer's galley, said base plate and ledges being preferably formed of a single piece of metal cast or otherwise given the desired form. In such other printers' galleys as I am familiar with a ledge is provided at each side of the base plate thereby adding to the expense of producing the galley and adding to its weight. D represents the side stick of my printer's galley which is formed with a dove-tail groove, *a*, extending through said stick from its outer end to a suitable point near its inner end and opening on its rear side, the inner end of said stick being formed with a flat or square projection, *b*, which extends into a slot, *c*, formed through the end ledge C of the galley. A screw threaded perforation is formed centrally in the end of said projection, *b*, in order to receive a thumb or set screw, *d*, a washer being interposed between the screw and the end of the projection. The purpose of the screw is to prevent the accidental withdrawal of the side stick from the ledge, to guide it in its movements across the base plate, and it may be used, also, to lock the stick in any desired position to which it has been adjusted on the base plate. The main purpose, however, of the screw, *d*, is to prevent the stick being withdrawn and to hold it accurately at right angles to the ledge and, in connection with the end of the stick which bears on the opposite side of the ledge above and below the slot *c*, to guide it in its movement, in such position, toward and from the side ledge B.

In the groove, *a*, of the side stick a bar, E, of dove-tail form in cross section, is arranged, said bar being of less length than the groove, and having formed on or secured to its outer or smaller edge laterally extending perforated lugs or ears, *e*, to which are pivoted the free ends of the links, F, the other ends of said levers being, preferably, reduced, and pivotally secured at the proper distance apart to the base plate A at or near its edge, whereby, when said links are swung on their pivots the bar E will be moved longitudinally in the groove, *a*, and the side stick D moved across the base plate to or from the side ledge according to the direction in which the links are moved. Thus it will be observed that the side stick is moved bodily at right angles to the end ledge across the base plate without liability of having one end thereof moved in advance of the other and its true alignment rendered constant at all times. When the stick is moved into the desired position it is locked in place by a thumb screw, *f*, on which is formed a cam surface, *g*, which enters the bar E and whose cam surface is adapted to engage the rear side of the stick, D, and thus lock the stick and bar together, and thereby preventing any movement of one or the other till the thumb screw is released.

It will be observed that I do away entirely with one side ledge of the galley, thus reducing the weight and cost of the same, and that my device presents no openings or slots, in connection with its movable parts, in such position as to be liable to catch dust, ink or other substance when in use as would tend to clog its operation.

Having thus described my invention, what I claim as new, and desire to secure by Letters Patent, is—

1. The combination, in a printer's galley having an end ledge formed with a slot therethrough, of a side stick having a groove formed therein and a projection at one end thereof, a bar adapted to fit said groove, and links pivotally connected to said bar and to the base of the galley, substantially as described.

2. The combination, in a printer's galley having an end ledge formed with a slot therethrough, of a side stick having a dove-tail groove formed therein, a bar of similar form fitted in said groove, lugs or ears projecting from said bar, links pivoted at one end to said bar and at the other to the base plate of the galley, and a screw entering the end of said side stick for holding the same at right angles to the end ledge of the galley, substantially as described.

3. The combination, in a printer's galley having an end ledge formed with a slot therethrough, of a side stick having a dove-tail groove formed lengthwise therein and an end projection adapted to enter said slot, a screw entering the end of said projection, a bar adapted to fit said groove and having laterally projecting lugs thereon, links pivotally attached to said lugs and to the galley base, and a thumb screw adapted to bind said bar to said side stick when turned in one direction and to release it when turned in the opposite direction, substantially as described.

4. The combination, in a printer's galley having an end ledge, of a side stick having a longitudinal dove-tail groove formed therein, a bar fitting in said groove, links for moving said bar longitudinally in said groove, and means for holding the side stick at right angles to the end ledge, substantially as described.

In testimony whereof I affix my signature in presence of two witnesses.

OWEN L. CARTER.

Witnesses:
J. F. BEALE,
HENRY J. GROSS.